United States Patent [19]

Kühnel

[11] 4,246,211

[45] Jan. 20, 1981

[54] PROCESS FOR THE PRODUCTION OF FOAM MATERIALS ON POLYOLEFIN BASIS

[75] Inventor: Werner Kühnel, Neunkirchen-Seelscheid, Fed. Rep. of Germany

[73] Assignee: Dynamit Nobel Aktiengesellschaft, Fed. Rep. of Germany

[21] Appl. No.: 20,722

[22] Filed: Mar. 15, 1979

[30] Foreign Application Priority Data

Mar. 17, 1978 [DE] Fed. Rep. of Germany ....... 2811642

[51] Int. Cl.³ ............................................. B29D 27/00
[52] U.S. Cl. ........................................ 264/37; 264/54; 264/140; 264/DIG. 18; 264/DIG. 69; 521/79; 521/81; 521/96; 521/134; 521/139; 521/140; 521/143
[58] Field of Search ........ 264/DIG. 18, 54, DIG. 69, 264/37, 140; 521/79, 81, 134, 96, 139, 140, 143

[56] References Cited

U.S. PATENT DOCUMENTS

| 3,098,832 | 7/1963 | Pooley et al. | 264/DIG. 18 |
| 3,655,542 | 4/1972 | Tamai et al. | 264/DIG. 18 |
| 3,812,225 | 5/1974 | Hosoda et al. | 264/DIG. 18 |
| 3,823,213 | 7/1974 | Stastny et al. | 264/DIG. 18 |
| 4,123,584 | 10/1978 | Brewton | 264/37 |

FOREIGN PATENT DOCUMENTS

1694130  8/1972  Fed. Rep. of Germany.

*Primary Examiner*—Philip Anderson
*Attorney, Agent, or Firm*—Craig & Antonelli

[57] ABSTRACT

A process for the production of foam materials, particularly polyolefin foam materials, from crosslinked polyolefin scraps involves comminuting and compressing crosslinked polyolefin foam scraps at a temperature lying below the decomposition temperature of a crosslinked agent contained therein, plasticating the resulting comminuted product also at a temperature lying below the temperature of the crosslinked agent, forming a shaped article from the plasticated material and thereafter crosslinking and expanding the shaped article by heating above the decomposition temperature of the crosslinking agent and of a blowing agent contained within said material. The initial foam scraps are obtained during the formation of a crosslinked polyolefin foam containing material.

12 Claims, No Drawings

PROCESS FOR THE PRODUCTION OF FOAM MATERIALS ON POLYOLEFIN BASIS

The invention relates to a process for the production of foam materials on polyolefin basis by mixing a polyolefin or a blend of a polyolefin with an elastomer and/or synthetic resins with an organic peroxide as the crosslinking agent and a blowing agent, wherein the decomposition temperature of the crosslinking agent is below the decomposition temperature of the blowing agent, and optionally with customary additives; forming of the mixture, at a temperature lying below the decomposition temperatures of the crosslinking agent and the blowing agent, into a shaped article; and subsequent crosslinking and expanding by heating the shaped article to above the decomposition temperatures of the crosslinking agent and the blowing agent. Such a process has been described, for example, in DAS [German Published Application] No. 1,694,130.

Quantities of scrap of foam material which are, in part, considerable are produced during the manufacture of foam sheets or panels, but at the latest during the further processing, due to edge cuttings. In case of very soft foam, such as, for example, soft polyurethane foams, no problem is encountered in comminuting the scrap and using same as upholstery material for pillow padding etc. In contrast thereto, considerably greater problems arose in the elimination of hard polyurethane foam; in this case, however, a process has been developed for the recovery of polyols from the hard polyurethane foam scrap, wherein the thus-recovered polyol can, in turn, be used for the manufacturing of new foam materials. Still another situation is encountered in case of scrap from thermoplastic foam on the basis of polystyrene, PVC, and polyethylene, having a large volume and thus a low apparent weight. They cannot be processed in a recycling operation, as is done with polyurethane hard foam, and their reprocessing as a regenerate fails due to their large volume and low apparent weight. In the book "Schaumkunststoffe, Entwicklungen und Anwendungen" [Foam Materials, Developments and Applications] by the Technical Foam Material Association in the Society of Plastics Processors, Carl Hanser publishers, Munich 1976, a process has been described for the recovery of thermoplastic foam scrap in a continuous compacting system fashioned as a disk-type kneader, in order to increase, in turn, the low apparent weight of the foam scrap. In this method, the foam chips are brought to a maximum temperature below the melting point of the thermoplastic and sintered. The sintered product can thereafter be comminuted as desired.

The present application relates to thermoplastic foam materials on polyolefin basis which are additionally crosslinked. Also in these crosslinked foam materials, the problem is encountered of how to utilize the scrap economically.

It has been found surprisingly that it is likewise possible to reuse foam scrap of crosslinked thermoplastic foamed plastics for the manufacture of foamed plastics. This is accomplished, according to the invention, by comminuting crosslinked polyolefin foam scrap, produced according to the method described hereinabove, and compressing same at a temperature lying below the decomposition temperature of the crosslinking agent, preferably between 100° C. and 140° C.; comminuting the product, insofar as it has not been obtained in comminuted form; and forming therefrom a shaped article under plasticization at a temperature lying below the decomposition temperature of the crosslinking agent; and crosslinking and expanding this shaped article by heating above the decomposition temperatures of the crosslinking agent and of the blowing agent.

It is possible by means of the process of this invention to reprocess already crosslinked foam material, as present in abundance in the form of scrap, into a homogeneous foamed article. A homogeneous foamed article is understood to mean a foamed article which again exhibits closed cells of uniform structure. A surprising result of the invention is, at the same time, that it is possible to reprocess the compressed, i.e. compacted foam scraps to an expanded and crosslinked component even without the addition of crosslinking agent and blowing agent. The bulk density of the shaped article produced from the foam scraps, though, is increased over that of the original foam material. One explanation for the invention could be seen in that there are residues of blowing agent and residues of crosslinking agent in the foam scraps stemming from the original manufacturing process, which agents have not as yet been decomposed and are activated during the renewed expanding and crosslinking process.

The polyolefin foam material utilized for the invention is produced according to conventional methods. The term "polyolefins" is understood to mean: high-pressure or low-pressure polyethylene, copolymers consisting essentially of ethylene, as well as mixtures thereof. Such mixed copolymers are, for example, ethylene-propylene copolymers, ethylene-butylene copolymers, copolymers of ethylene and vinyl acetate and the derivatives thereof, copolymers of ethylene and acrylic acid esters or the derivatives thereof, copolymers of ethylene and methacrylic acid esters or the derivatives thereof, or the like. Also mixtures of the above-mentioned polyolefins with elastomers and/or synthetic resins can be processed into fine-pored foams by this invention. These are understood to be mixtures, for example, which contains up to 100% by weight of polyolefin. Elastomers miscible with polyolefin are, for example, natural rubber, ethylene-propylene elastomer, butyl elastomer, polyisobutylene, styrene-butadiene elastomer, polybutadiene, polybutene, and polyisoprene. Synthetic resins miscible with polyolefin are, for example, polystyrene, polypropylene, chlorinated polyethylene, sulfochlorinated polyethylene, or the like.

Preferably employed polyolefins are polyethylenes, low-pressure and high-pressure polyethylene, depending on the mixture composition, but preferably high-pressure polyethylene having a density of 0.91–0.94 g./cc.

Suitable organic peroxides are, depending on the composition of the polyolefin, 2,5-dimethyl-2,5-di(tert.butylperoxy)hexane, tert.-butyl hydroperoxide, cumyl tert.-butyl peroxide, di-tert.-butyl peroxide, preferably dicumyl peroxide. The peroxides are used in amounts of about 1%. The decomposition temperature of dicumyl peroxide is about 170° C., at which point crosslinking commences.

The preferably employed blowing agent, azodicarbonamide, has a decomposition temperature above 190° C., which is higher than that of the crosslinking agent. The concentration of the blowing agent is dependent on the bulk density of the product to be expanded and ranges between 0.5% and 25% by weight, based on the total mixture, preferably 1–15% by weight of the mixture to be formed into a shaped article; in this case, foams are obtained having a bulk density of 20 kg./m³ to 300 kg./m³, depending on the batch.

Customary additives ordinarily employed together with synthetic resins on polyolefin basis are, for example, light-protection agents, pigments, fillers, e.g. chalk, flame retardants, antistats, mold release agents, or the like, which can be added to the mixture to be crosslinked and expanded before thermoplastic processing into a panel.

Foam scraps having a very high bulk density can strongly tend toward tackiness during compacting and plasticizing to obtain the shaped article. According to the invention, here the provision is made to add to the foam scraps additionally crosslinking agents up to about 1 part by weight, based on 100 parts by weight of foam scraps. In the same way, it is also possible in case of foam scraps, especially those having a high bulk density, to add furthermore blowing agents, preferably azodicarbonamide, up to about 15 parts by weight, based on 100 parts by weight of foam scraps. The higher the bulk density of the foam scraps utilized, the more blowing agent can be added.

The preparing and compressing of the crosslinked polyolefin foam particles for reprocessing can be effected according to several methods. A preferred mode of operation provides that the comminuted foam scrap is compressed by intensive mixing at an elevated temperature, so that the air is forced out and a substantially higher bulk density is obtained. However, it is also possible to compress the foam scrap, for example, by extrusion and then comminute the product again (granulation).

The invention shows a way for reprocessing crosslinked closed-cell polyolefin foam scraps by themselves into new foamed articles. In a further development of the invention, however, the provision is also made to process the foam scrap together with a mixture of raw materials for the manufacture of crosslinked polyolefin foams in combination to obtain new foamed articles. This is done according to this invention by mixing the compressed and comminuted foam scrap with the raw materials for the production of a crosslinked polyolefin foam material; optionally compounding and comminuting the mixture at a temperature below the decomposition temperature of the crosslinking agent; and forming therefrom a shaped article under plasticization at a temperature lying below the decomposition temperature of the crosslinking agent; and then crosslinking and expanding this article by heating. Due to these process steps, it is made possible to process already crosslinked foam material with a non-crosslinked raw material mixture together into a new, crosslinked homogeneous foam material, wherein the total mixture is crosslinked and expanded. Since the large volume of the foam scrap is reduced by a compression step conducted at a temperature below the decomposition temperature of the crosslinking agent, the foam particles can be more readily processed in a larger volume with the fresh batch of the foam material. The essential feature of the process of this invention is that the crosslinked foam scrap is treated during further processing always at a temperature lying below the decomposition temperature of the crosslinking agent, up to the point in time when the renewed crosslinking is initiated.

The proportion of crosslinked polyethylene foam which can be reprocessed with a raw material mixture is, on the whole, variable. Preferably, 10–50 parts by weight of crosslinked foam scrap is utilized per 100 parts by weight of total mixture, and processed in combination. For the reincorporation of crosslinked polyolefin foam materials, it is possible to use lightweight as well as heavy polyolefin foam materials, i.e. the bulk density of the foam chips does not play any part; differing bulk densities can be employed for the foam scrap as well as the mixture of raw materials and can thus be processed into a new foam material.

The invention makes it possible to utilize crosslinked foam scrap without problems and in an economical fashion, due to the fact that this scrap can be reprocessed into foamed articles and wherein a uniform cellular structure is attained.

The specially pretreated polyolefin foam scraps are incorporated into the chemically crosslinked polyolefin foam material prepared according to the known methods by introducing the scrap into the fresh batch of the raw materials. The polyethylene foam scrap prepared by comminuting and compression is mixed with the polyolefin, peroxide, blowing agent, and other additives, such as flame retardants, fillers, light-protection agents, etc., and optionally compounded at a temperature lying below the decomposition point of the peroxide and that of the blowing agent. From this mixed material, which is present as a cold mixture or optionally in granulated form, a shaped component is produced by plasticizing, e.g. by rolling or by extrusion via an extruder, wherein the shaping step takes place below the decomposition temperature of the peroxide and that of the blowing agent. The shaped component produced in this way, which is also called matrix, is thereafter crosslinked by heating to below the decomposition point of the blowing agent and then expanded after elevating the temperature above the decomposition temperature of the blowing agent. The expansion step can be effected continuously e.g. in a heating channel, or discontinuously, e.g. in a heating chamber.

For the reincorporation of crosslinked polyolefin foam scrap as produced, for example, as edge cuttings, foam material of any bulk density is suitable, customarily ranging in case of polyolefin foam materials between 15 and 200 kg.lm³. The foam scraps are still further comminuted by means of a cutting mill, even though they are already present in piece form. For this purpose, cutting mills are used, for example, with screens of 1–20 mm. The compacting of the comminuted foam scraps can take place, for instance, by thorough mixing at an elevated temperature in a mixer or by means of rolling on a rolling mill or by extrusion by means of a screw extruder. In this connection, it an essential factor for conducting the process of this invention that the bulk temperature of the foam scrap during compression be lower than the decomposition temperature of the crosslinking agent employed. If the crosslinked foam scrap is ground up, for example, in a hot mixer and the foam particles are compressed during this step, then, as discharge, compacted chips are obtained in the form of an agglomerate. While passing through an extruder, the compressed skein is once more comminuted at the outlet. Compressed foam agglomerate or compressed foam chips, which practically no longer represent a foam material, are introduced, for example, as a cold mixture together with the raw materials of the fresh batch, for the production of a crosslinked polyolefin foam, advantageously directly into a shaping machine, e.g. an extruder, to manufacture the matrix which subsequently is to be crosslinked and expanded. For those cases where the homogenization of the cold mixture in the shaping machine is insufficient, the process of this invention can be varied insofar as this cold mixture of the compressed foam particles and the fresh batch is compounded and/or granulated. Also in this variant of the process it is necessary to provide that the temperatures occurring during compounding for the production of the granulated material are lower than the decomposition temperature of the peroxide. Preferably, the compounding and granulating of foam scraps and raw material mixture are effected at temperatures of below 140° C. If these conditions are maintained, a secondary new foam material is obtained in the form of sheets, panels, or the like, the physical properties and molding characteristic of which correspond to those of a foam material produced merely of a fresh batch on the same raw material basis.

The invention is explained hereinbelow with reference to examples.

The preparation and compression of the crosslinked polyolefin foam particles for reuse in the production of chemically crosslinked polyolefin foam materials can be accomplished according to several processes:

(A) Preparation by rolling on a rolling mill

The crosslinked polyolefin foam chips are compacted on a rolling mill at a roll surface temperature of 110° C. and a speed of 17 r.p.m.

(B) Preparation by mixing in a hot mixer:

Roughly comminuted polyolefin foam chips are introduced into a fluid mixer and thoroughly mixed up to a temperature of 150° C. so that the chips are compressed, the air is forced out, and a substantially higher bulk density is obtained than in case of chips which have not been prepared.

(C) Preparation by extrusion:

Larger pieces of scrap, such as edge cuttings or punched-out residues of crosslinked polyolefin foam and/or comminuted polyolefin foam chips are processed by way of a continuously compressing machine, e.g. a twin-screw extruder. Here again, the operating temperature while the mixture passes through the extruder must lie below the decomposition temperature of the peroxide.

The mixture of raw materials and compressed, crosslinked polyolefin foam particles can optionally also be compounded by means of the three processing steps listed under (A), (B), and (C), and can subsequently be granulated.

EXAMPLE 1

100 parts by weight of a fresh batch for crosslinked polyolefin foam having a bulk density of 115 kg./m$^3$, consisting of 95 parts by weight of high-pressure polyethylene with a melt index of 4 g./10 min. (190° C., 2.16 kp.), 1 part by weight of dicumyl peroxide, and 4 parts by weight of azodicarbonamide is mixed in a mixer with 15 parts by weight of crosslinked polyolefin foam particles, produced from an identical fresh batch and prepared according to process (B); thereafter, the mixture is introduced into a rolling mill with a surface temperature of 110° C. so that a rolled sheet is formed which is subsequently rolled for another 5 minutes. The rolled sheet is taken off and pressed at a temperature of 130° C. into a shaped article in the form of a smooth panel. From this panel, corresponding to the extruded matrix in the continuous manufacturing process of the crosslinked polyolefin foam materials, samples are punched out having a diameter of 180 mm., and crosslinked and expanded in a drying chamber having an internal air temperature of 210° C. The thus-obtained panel of foam material has a bulk density of 120 kg./m$^3$ and does not differ, with regard to its properties, from a foamed panel produced only of a fresh batch, except for a slightly increased bulk density.

EXAMPLE 2

100 parts by weight of a fresh batch for a crosslinked polyolefin foam having a bulk density of 115 kg./m$^3$ as in Example 1, but reduced by 15 parts by weight of highpressure polyethylene, is employed; instead, another 15 parts by weight of crosslinked polyolefin foam chips, prepared according to process (B), is added thereto. Further processing into the finished foam panel takes place as described in Example 1.

The thus-obtained foam panel has a bulk density of 110 kg./m$^3$. The bulk density of the foam panel is reduced as compared to the fresh batch, which is due to the residues of blowing agent present in the foam scrap.

EXAMPLE 3

A fresh batch and crosslinked foam chips are used in correspondence with Example 2, but the fresh batch is granulated with the foam chips before the shaped article is thereafter produced as described in Example 1. The resultant crosslinked foam panel has a bulk density of 120 kg./m$^3$.

EXAMPLE 4

100 parts by weight of fresh batch for a polyolefin foam having a bulk density of 30 kg./m$^3$, consisting of 84.1 parts by weight of high-pressure polyethylene with a melt index of 4 g./10 min. and 0.9 part by weight of dicumyl peroxide and 15 parts by weight of azodicarbonamide is mixed in the cold state with 15 parts by weight of crosslinked polyolefin foam chips having a bulk density of 30 kg./m$^3$, prepared according to process (B) and then further processed analogously to Example 1. The final product, a crosslinked polyolefin foam panel, has a bulk density of 32 kg./m$^3$.

EXAMPLE 5

100 parts by weight of a fresh batch for a polyolefin foam material having a bulk density of 30 kg./m$^3$ according to Example 4 and 20 parts by weight of foam chips having a bulk density of 30 kg./m$^3$, prepared according to process (B) and processed as described in Example 1 result in a final product in the form of a crosslinked foam panel having a bulk density of 35 kg./m$^3$.

EXAMPLE 6

The procedure of Example 5 is followed, but with the use of, in total, 25 parts by weight of crosslinked foam chips having a bulk density of 30 kg./m$^3$. The final product has a bulk density of 39 kg./m$^3$.

EXAMPLE 7

100 parts by weight of crosslinked foam chips having a bulk density of 130 kg./m$^3$, produced from a fresh batch made up of 74 parts by weight of high-pressure polyethylene and 21.9 parts by weight of ethylene-vinyl acetate copolymer and 0.9 part by weight of dicumyl peroxide and 3.2 parts by weight of azodicarbonamide is granulated according to process (C) at a bulk temperature of about 120° C., and a rolled sheet is produced on a rolling mill analogously to Example 1 and further processed as described in Example 1 to a new foam panel. The thus-obtained foam panel has a bulk density of 320 kg./m³.

EXAMPLE 8

100 parts by weight of a fresh batch for a polyolefin foam material having a bulk density of 115 kg./m³, consisting of 95 parts by weight of high-pressure polyethylene with a melt index of 4 g./10 min. and 1 part by weight of dicumyl peroxide and 4 parts by weight of azodicarbonamide is mixed with 15 parts by weight of crosslinked polyolefin foam scrap of a bulk density of 115 kg./m³, present in agglomerate form as prepared according to process (B), and an additional 0.12 part by weight of dicumyl peroxide, and the mixture is granulated at a bulk temperature of about 120° C. Thereafter, a rolled sheet is produced on a rolling mill from the granulated material, and therefrom a foam panel is manufactured as indicated in Example 1. This foam panel has a bulk density of 118 kg./m³.

EXAMPLE 9

100 parts by weight of a fresh batch for a polyolefin foam material having a bulk density of 30 kg./m³, consisting of 84 parts by weight of high-pressure polyethylene with a melt index of 4 g./10 min. and one part by weight of dicumyl peroxide and 15 parts by weight of azodicarbonamide is mixed with 15 parts by weight of crosslinked polyolefin foam scrap having a bulk density of 50 kg./m³, present as an agglomerate as prepared according to process (B), and a rolled sheet is produced therefrom on a rolling mill. From this rolled sheet, a foam panel is produced furthermore as indicated in Example 1. This foam panel has a bulk density of 43 kg./m³.

EXAMPLE 10

100 parts by weight of a fresh batch for a polyolefin foam material having a bulk density of 30 kg./m³, consisting of 84 parts by weight of high-pressure polyethylene with a melt index of 4 g./10 min. and 1 part by weight of dicumyl peroxide and 15 parts by weight of azodicarbonamide is granulated with 70 parts by weight of crosslinked polyolefin foam scrap having a bulk density of 50 kg./m³, present as an agglomerate prepared according to process (B), and a rolled sheet is produced therefrom on a rolling mill. A foam panel is prepared from this rolled sheet as indicated in Example 1. This foam panel has a bulk density of 60 kg./m³.

EXAMPLE 11

100 parts by weight of a fresh batch for a polyolefin foam material having a bulk density of 30 kg./m³, consisting of 84.2 parts by weight of ethylene-vinyl acetate copolymer and 0.8 part by weight of dicumyl peroxide and 15 parts by weight of azodicarbonamide is mixed with 15 parts by weight of foam scraps from ethylene-vinyl acetate copolymers having a bulk density of 30 kg./m³, prepared as an agglomerate according to process (B), and a rolled sheet is prepared from this mixture on a rolling mill. A foam panel is further produced therefrom as described in Example 1. This foam panel has a bulk density of 36 kg./m³.

What is claimed is:

1. A process for the production of polyolefin foam material from crosslinked polyolefin foam scraps which comprises mixing a polyolefin or a blend of a polyolefin with an elastomer and/or other synthetic resin with an organic peroxide as a crosslinking agent and a blowing agent, the decomposition temperature of the crosslinking agent being below the decomposition temperature of the blowing agent; forming the resulting mixture at a temperature lying below the decomposition temperatures of the crosslinking agent and the blowing agent into a first shaped article; subsequently crosslinking and expanding the first shaped article by heating to above the decomposition temperatures of the crosslinking agent and the blowing agent to form the first shaped article into a crosslinked polyolefin containing foam material; obtaining scraps of said crosslinked polyolefin-containing foam material produced during the formation of the first shaped article; comminuting and compressing the crosslinked polyolefin-containing foam scraps at a temperature lying below decomposition temperature of the crosslinking agent, futher comminuting the resulting compressed product insofar as the product is not obtained in comminuted form; plasticating the comminuted product at a temperature lying below the decomposition temperature of the crosslinking agent, forming a second shaped article from plasticated material; and crosslinking and expanding the second shaped article by heating to above the decomposition temperatures of the crosslinking agent and of the blowing agent.

2. A process according to claim 1 wherein the foam scraps are comminuted and compressed at a temperature between 100° C. and 140° C.

3. A process according to claim 1 wherein said polyolefin or a mixture of said polyolefin with the elastomer and/or the other synthetic resin is further admixed with an additive selected from the group consisting of light-protection agents, pigments, fillers, flame retardants, antistats, mold release agents, and mixtures thereof.

4. A process according to claim 1 wherein the compressed and comminuted foam scraps are mixed with the polyolefin or the mixture of a polyolefin with an elastomer and/or another synthetic resin used for the production of the crosslinked polyolefin-containing foam material to provide a foam-forming mixture, thereafter said mixture is compounded and comminuted at a temperature lying below the decomposition temperature of the crosslinking agent, the second shaped article is formed from said mixture at a temperature lying below the decomposition temperature of the crosslinking agent and subsequently the second shaped article is crosslinked and expanded by heating.

5. A process according to claim 4, wherein 10–50 parts by weight of foam scraps is utilized per 100 parts by weight of the total mixture.

6. A process according to claim 1, wherein a polyolefin alone is admixed with the crosslinking agent and the blowing agent, and the polyolefin is polyethylene.

7. A process according to claim 1, wherein additionally crosslinking agents are added to the foam scraps, up to about 1 part by weight, based on 100 parts by weight of foam scraps.

8. A process according to claim 1 wherein additionally blowing agents are added to the foam scraps, up to about 15 parts by weight, based on 100 parts by weight of foam scraps.

9. A process according to claim 1 wherein the comminuted foam scraps are compressed by intensive mixing.

10. A process according to claim 1 wherein the foam scraps are compressed by extrusion.

11. A process according to claim 1 wherein the foam scraps have a bulk density which is different from that of the raw material mixture to be expanded.

12. A process according to claim 1 wherein the compounding of foam scraps and raw material mixture is effected at temperatures of below 140° C.

* * * * *